United States Patent [19]

Moore

[11] 4,040,577
[45] Aug. 9, 1977

[54] LOCKWOOD AIRFOIL USED IN CONJUNCTION WITH MAN TRANSPORT DEVICE

[75] Inventor: Thomas M. Moore, Huntsville, Ala.

[73] Assignee: The United States of America as represented by the Secretary of the Army, Washington, D.C.

[21] Appl. No.: 759,937

[22] Filed: Jan. 17, 1977

[51] Int. Cl.² ............................................. B64C 39/02
[52] U.S. Cl. .................................................. 244/4 A
[58] Field of Search .................. 244/4 A, 4 R, 12.1, 244/12.4, 23 R, 23 A, 23 D, 12.5, 42 CC, 42 CD, 7 C

[56] References Cited

U.S. PATENT DOCUMENTS

| 3,075,725 | 1/1963 | Dornier | 244/42 CC |
| 3,098,625 | 7/1963 | Thielman | 244/4 A |
| 3,149,799 | 9/1964 | Hulbert | 244/4 A |
| 3,243,144 | 3/1966 | Hulbert et al. | 244/4 A |
| 3,558,079 | 1/1971 | Curriston | 244/4 A |
| 3,584,811 | 6/1971 | Leavy et al. | 244/42 CC |

*Primary Examiner*—Trygve M. Blix
*Assistant Examiner*—Galen L. Barefoot
*Attorney, Agent, or Firm*—Nathan Edelberg; Robert P. Gibson; James T. Deaton

[57] ABSTRACT

A man transport device that is strapped to a person and has two turbo type engines with controls for actuating devices at the turbo jet engines to control lift, roll, pitch and yaw of the device and also to utilize control of fluid through span wise slots or holes in the structure interconnecting the turbo jets to increase the lift/drag of the system and therefore increase the range attainable by this device.

4 Claims, 5 Drawing Figures

LOCKWOOD AIRFOIL USED IN CONJUNCTION WITH MAN TRANSPORT DEVICE

DEDICATORY CLAUSE

The invention described herein may be manufactured, used, and licensed by or for the Government for governmental purposes without the payment to me of any royalties thereon.

CROSS REFERENCE TO RELATED ART

This application is related to devices of the type disclosed in U.S. Pat. Nos. 3,023,980, 3,098,625 and 3,150,847.

BACKGROUND OF THE INVENTION

In the past, various man transport or jet vest type devices have been provided to propel an individual from one area to another. However, in these devices, they have not always had the simplicity or the range desirable in a device of this type.

Therefore, it is an object of this invention to provide a man transport device that has simple hand actuated controls that directly actuate devices at the turbo jet engines to provide accurate control thereof.

Another object of this invention is to utilize fluid pressure from a high pressure side of each turbo jet engine to blow this fluid or gas chordwise over a wing structure or interconnection between the turbo jet engines to give the device increased range capability.

Other objects and advantages of this invention will be obvious to those skilled in this art.

SUMMARY OF THE INVENTION

In accordance with this invention, a man transport jet type apparatus is provided that includes a harness mechanism for attaching the device to the body of an individual in a conventional manner. The device itself includes two jet type engines that are interconnected by a wing type structure that has slots or holes therein for allowing fluid such as gas to be blown chordwise over the wing structure and increase lift and attainable range of the device. The device includes a central control panel with a control for actuating fuel valves for controlling and throttling the fuel going to the jet engines, a control for controlling vanes or swivelable nozzles at the outlet ends of the jet engines to control roll and pitch of the individual, and a third control which controls the fluid such as gas that is blown through the slots or holes of the wing structure to give the device the capability of increased lift and increased range. The control for actuating the valves which control the amount of fuel going to the jet engines and the control for actuating the control vanes or nozzles at the exhaust of the jet engines are such that the interconnections to these devices can cause the valves to be opened or closed in unison or have one valve actuated in an opening direction while the other valve is actuated in a closing direction. This type action is utilized to give a yaw type control to the device. The control for the vanes or adjustable nozzles are actuated by interconnections in the same manner as that for the fuel control valves.

DESCRIPTION OF THE PREFERRED EMBODIMENT

Figure 1:
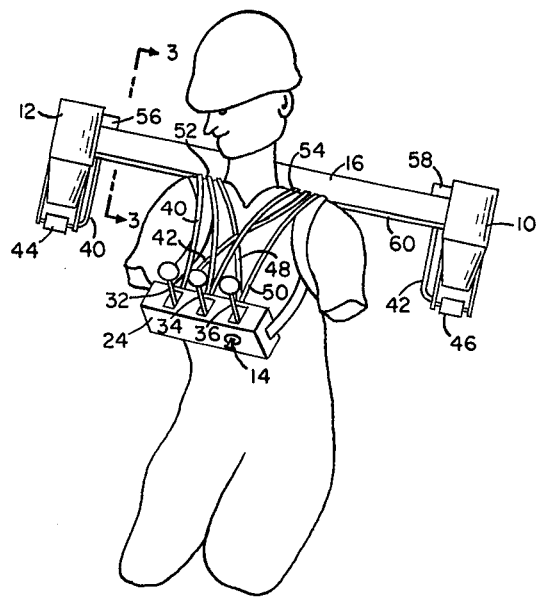
FIG. 1 is a perspective view of a device in accordance with this invention.
Figure 2:
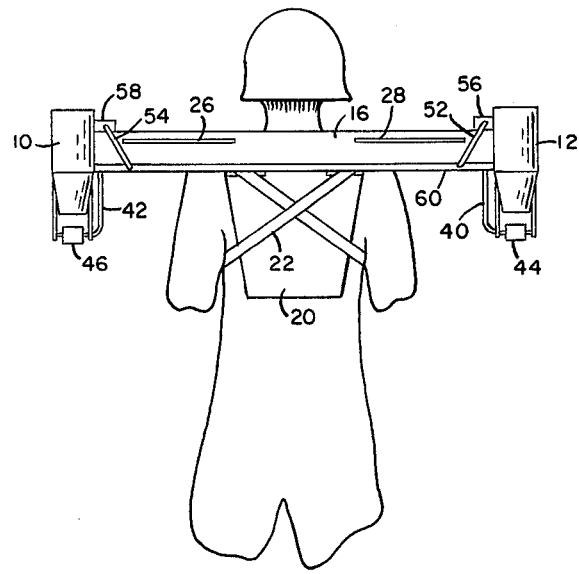
FIG. 2 is a rear view of the device in accordance with this invention.
Figure 3:
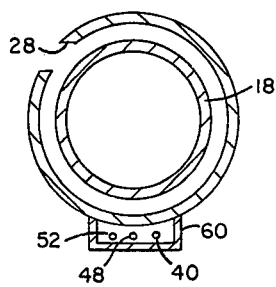
FIG. 3 is a sectional view taken along line 3—3 of FIG. 1.

Referring now to the drawing, a jet vest man transport control system with a Lockwood type airfoil wing arrangement according to this invention includes a pair of conventional turbo jet type engines 10 and 12 that are controlled by on/off switch 14 that is connected for control of conventional starting means for turbo jet engines 10 and 12. Turbo jet engines 10 and 12 are interconnected by a wing type structure 16 that contains an inner tank 18 (see FIG. 3) that may be utilized for containing the fuel for turbo jet engines 10 and 12. Any conventional means may be used for pressurizing or otherwise dispensing the fuel to turbo jet engines 10 and 12. As illustrated in FIG. 3, the interconnecting wing structure 16 is generally circular, however this structure could be streamlined or any other appropriate shape that would aid in the flight of the individual. Wing 16 is attached to a back vest type plate 20 in a conventional manner and conventional type auxiliary fasteners 22 strap the wing and turbo jet engines as well as front control panel 24 to the individual. Wing 16 has span wise slots or holes 26 and 28 (see FIG. 2) which have fluid such as gas blown therethrough to provide increased lift at a cost which is relatively modest compared to the increase in energy required for blowing through these slots. Slots 26 and 28 are shaped so that the gas is discharged chordwise over the wing surface.

Figure 5:
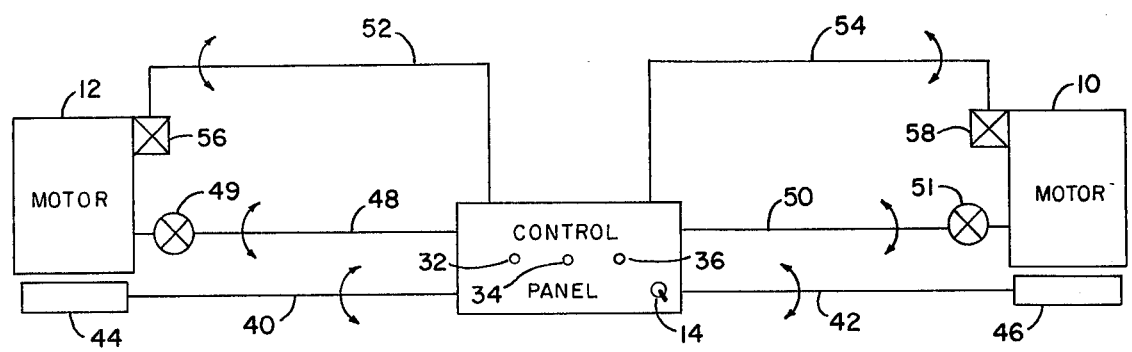
FIG. 5 is a schematic illustration of the control device according to this invention.
Figure 4:
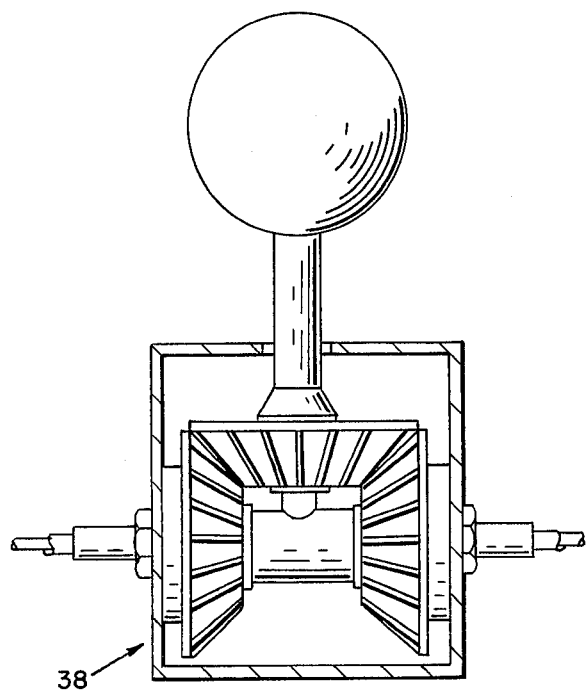
FIG. 4 is a view of a mechanical drive in accordance with this invention.

Control panel 24 has three control levers 32, 34 and 36 for controlling flight of the individual. Control levers 32 and 36 are connected through gear drive 38 such as illustrated in FIG. 4 to actuate their controls. Control lever 32 is connected through a gear drive 38 such as illustrated in FIG. 4 for actuating cables 40, 42 which are interconnected to exhaust control vanes 44, 46. Control lever 32 can be pivoted to cause control vanes 44 and 46 to be pivoted in unison or control lever 32 can be rotated about its shaft to cause one control vane to be actuated in one direction and the other control vane to be actuated in the opposite direction. These two actions of control lever 32 can cause roll and pitch adjustments to be imparted to the system and therefore the one being transported. Control lever 36 is likewise connected to a gear mechanism of the type illustrated in FIG. 4 to drive cables 48 and 50 to adjust valves 49, 51 (see FIG. 5) to control the amount of fuel going to turbo jet engines 10 and 12. Control lever 36 is actually a throttle control in which lever 36 can be pivoted to cause each of control valves 49, 51 to be opened the same amount to cause equal amounts of thrust to be produced from each turbo jet engine and therefore cause vertical lift to take place or control lever 36 can be rotated to cause control valves 49, 51 to deliver differing amounts of fuel to turbo jet engines 10 and 12 to cause a differential thrust to be produced by turbo jet engines 10 and 12. This action of the differential thrust produces a yaw type action of the system and the individual to which the device is attached.

Control lever 34 is connected to a push/pull type mechanism or to a gear drive such as illustrated in FIG. 4 to actuate cables 52 and 54 to open and close control valves 56 and 58. Control valves 56 and 58 are connected to the high pressure side of turbo jet engines 10 and 12 to provide the fluid or gas to slots 26 and 28. Lever 34 is actuated to the extent desired to provide the amount of chordwise blowing through slots 26 and 28 to increase the lift of the device and to increase the lift/drag of the system. By utilizing the blowing of gas through slots 26 and 28, the range of the device is increased. It should also be noted that the cables for the three control valves are channeled through an inclosing housing 60. This makes for a more streamline type construction and places the cables in a concealing type housing.

In operation, on/off control switch 14 is turned on to actuate the appropriate conventional starting mechanisms for turbo jets 10 and 12 and each of the turbo jet engines 10 and 12 are started up in any conventional manner. With the device strapped on the individual desired to be transported, and with the turbo jet engines 10 and 12 started, the individual is ready for takeoff. Control levers 32, 34 and 36 are biased into a neutral position for vertical takeoff. When the individual is ready for takeoff, control lever 36 is pivoted to increase the flow of fuel to each of turbo jet engines 10 and 12 and the individual begins to rise vertically. After the individual has risen to a predetermined altitude, control levers 32 and 34 are appropriately actuated to cause the person to turn, pitch and move forward in a generally horizontal direction as desired. Generally speaking, the control of air from valves 56 and 58 that is blown through slots 26 and 28 is not actuated until the individual has moved from the ground. Preferably, the individual is several feet above the ground level when the air is exhausted through slots 26 and 28 to cause efficient horizontal movement of the individual. However, movement of the individual horizontally can be started when the individual is only a short distance above the ground such as 4 or 5 feet. In the use of the apparatus as disclosed in this invention, the thrust force of the device is always kept above the center of gravity of the person wearing the device plus the equipment itself. By maintaining the thrust force above the center of gravity insures stability and enables the individual to have more complete maneuverability and control.

I claim:

1. A device for transporting an individual in the atmosphere comprising a pair of jet engines interconnected by a wing structure that has openings therein for the blowing of a fluid chordwise over the wing to increase lift of the device and thereby the range of the device, said wing structure being attached to a back plate with a harness connecting said back plate to a front control panel for mounting the device on an individual, said front control panel having means thereon for controlling the starting of the jet engines and three control actuators interconnected to means at the jet engines for controlling exhausting forces from the jet engines, for controlling the amount of fuel supplied to the jet engines and for controlling fluid flow from a high pressure side of the jet engines to said openings in the wing structure.

2. A device as set forth in claim 1, wherein said means at the exhaust of each of said jet engines includes jet vanes that are pivotally mounted and actuated by one of said control actuators to cause the jet vanes to move in unison and in opposite directions when said one of said control actuators is pivoted and rotated.

3. A device as set forth in claim 2, wherein said means for controlling the amount of fuel supplied to the jet engines includes a fuel valve at each jet engine for controlling the amount of fuel supplied to its respective jet engine and actuated by a second of said control actuators to cause each said fuel valve to be actuated in unison to supply equal amounts of fuel to the jet engines and to cause each said fuel valve to be actuated in an opposite direction to the other to cause differential thrust to be produced by the jet engines when desired.

4. A control device as set forth in claim 3, wherein said means for controlling fluid flow from the high pressure side of said jet engines includes a fluid valve at each jet engine and actuated by a third of said control actuators to open and close each said fluid valve an equal amount to provide equal amounts of fluid to said openings in the wing structure.

* * * * *